UNITED STATES PATENT OFFICE.

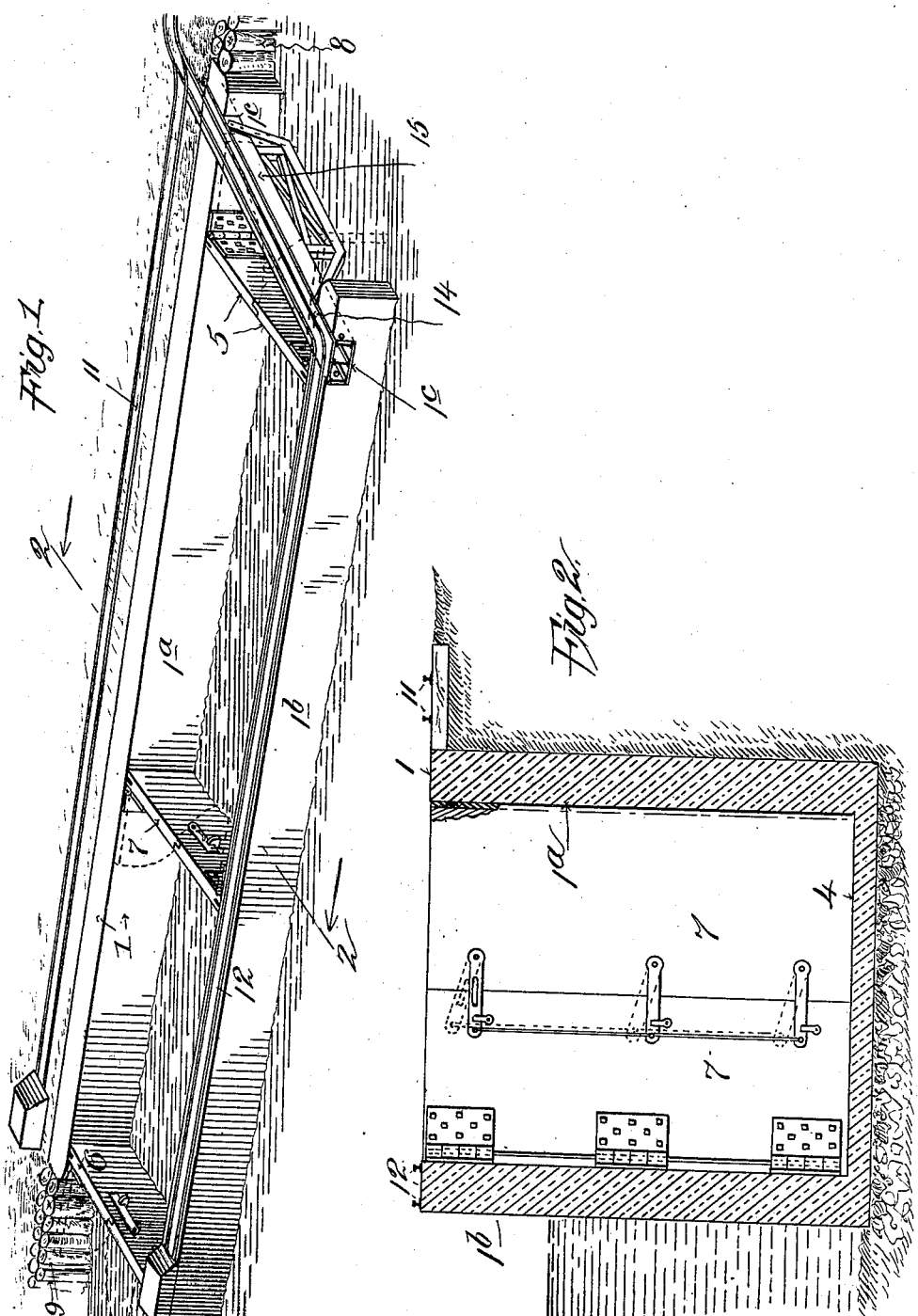

HENRY W. GOODRICH, OF NUTLEY, NEW JERSEY.

DRY-DOCK.

995,862.  Specification of Letters Patent. Patented June 20, 1911.

Application filed May 3, 1911. Serial No. 624,694.

*To all whom it may concern:*

Be it known that I, HENRY W. GOODRICH, a citizen of the United States, and resident of Nutley, in the county of Essex and State of New Jersey, have invented certain new and useful Improvements in Dry-Docks, of which the following is a specification.

Dry docks, as known to me, extend substantially at right angles to the shore line and are open at one end only for the admission and exit of vessels. Some dry docks extend for some distance into the water from the shore line, and for very long vessels docks or their ways project from the shore line to such an extent as to interfere with navigation close to the shore, and require considerable excavation within the shore line.

The object of my invention is to provide a dry dock which will be parallel to the shore line so that a vessel may enter or leave from either end, the opposite ends of the dry dock being adapted to open so that a vessel may float into the dock bow-on or stern-on and pass out of the dock also bow-on or stern-on. This arrangement also serves to reduce the expense of excavating the earth within the shore line, and lessens obstruction to navigation along the shore line in accordance with the relatively limited width of the dock from the shore line. The bottom may be dredged, if required, adjacent the opposite open ends of the dock, and within the latter as required, for the vessels. The dry dock may also be provided with one or more interior gates to divide the same into compartments, whereby a plurality of vessels may be repaired in the dock simultaneously by closing the intermediate gate or gates, and a relatively long vessel may be repaired in the dock by swinging the intermediate gate or gates open or removing the same. The walls forming the dock, including the gates, may be so constructed as to provide for a roadway or railway on the top of said walls, and on the gate if desired, thus permitting cheaper operation in delivering material to a vessel occupying the dock.

In the accompanying drawings I have illustrated my improvements in a more or less diagrammatic form, wherein, Figure 1 is a perspective view illustrating my improved dock, and Fig. 2 is a section on the line 2, 2, in Fig. 1.

The general construction of the dry dock may be of any approved form of material and relative arrangements of parts suited to practice in constructing dry docks.

My improved dry dock 1 is shown extending parallel with the shore line, the inner wall 1$^a$ extending parallel with the shore line and the outer wall 1$^b$ is constructed at a suitable distance therefrom and parallel with wall 1$^a$. The walls may be constructed of concrete as illustrated, or any suitable material, such as piling and boards, and a floor 4 may be provided between the walls 1$^a$, 1$^b$, (see Fig. 2), upon which blocks may be erected to hold a vessel. At opposite ends of the dock are gates 5, 6, which may be arranged in any well-known manner, being preferably hinged to swing outwardly, and having suitable packing and locks at the joints to exclude water when required, and may be in the nature of flood-gates, although it will be understood that the gates may be raised and lowered in a well-known manner if preferred. Within the dock are one or more gates 7, which may be arranged as described with respect to gates 5, 6, whereby the dry dock may be divided into several compartments, thus permitting independent use of the different parts of the dock. At opposite ends of the dock, and extending along the shore line for any suitable distance, substantially in line with the inner wall 1$^a$ of the dock, I provide a bulkhead or piling 8, 9, along which the vessels may slide as they are entering or passing from the dock.

Railway tracks 11, 12 are shown extending along and across the dock. The tracks may be built directly upon both walls 1$^a$, 1$^b$, or only upon the outer wall 1$^b$, and upon the land along the inner wall 1$^a$. The transverse rails 14 connect with the other rails in suitable manner. I have shown a suitable bridge 15 carrying the rails 14 to join with the rails 12, which bridge may be raised and lowered or swung to one side by any suitable means. I have shown the walls 1$^a$, 1$^b$ provided with seats or recesses 1$^c$ to receive the bridge to support and prevent lateral movement of the latter. If preferred, the rails may be laid directly upon the gates. Rails 14 may be at both ends of the dock if preferred.

By means of my improved dry-dock the vessel to be repaired may enter the dock bow-on, while the dock is charged with water at the normal level, and may remain floating in the water for certain repairs, painting, etc., but when the hull is to be repaired, painted or the like, the gates may be closed and the water pumped out of the dock, thus not requiring the use of the ways sometimes employed in dry docks. When the vessel has been repaired and the gates are opened the water flowing into the dock will float the vessel, and the same may then be removed from the dock either bow-on or stern-foremost. Where the vessel is longer than one of the compartments the intermediate gate or gates may be opened, but where the vessel is shorter than the compartment the intermediate gate or gates may be closed and thus two or more vessels may be retained in the dock at the same time, one of which compartments may be drained of water while the other compartment may be charged with water, if desired. By running cars along the tracks the handling of material used in repairs is facilitated, and plates, beams or the like may be carried to the side of the vessel requiring the same without passing over or across the deck.

My improvements are relatively cheap to install and maintain compared to ordinary dry docks having ways and machinery for drawing and holding the vessel out of the water, and embrace other advantages pointed out.

Having now described my invention what I claim is:—

1. A dry dock extending substantially parallel with the shore line, and provided with means at opposite ends for opening and closing the dock for the admission and exit of vessels.

2. A dry dock extending substantially parallel with the shore line, and provided with means at opposite ends for opening and closing the dock for the admission and exit of vessels, and a gate within the dock between its ends to divide the dock into a plurality of compartments as required.

3. A dry dock located wholly in the water without the shore line and extending along the latter and provided with gates at opposite ends to admit and exclude water and permit the entrance and exit of vessels to or from either end.

4. A dry dock located wholly in the water without the shore line and extending along the latter and provided with gates at opposite ends to admit and exclude water and permit the entrance and exit of vessels to or from either end, and a gate within the dock between its ends to divide the dock into a plurality of compartments as required.

5. A dry dock located within the water and extending parallel to the shore line and provided with gates at opposite ends, combined with a bulk-head extending along the shore line substantially in line with the inner shore line wall of the dock.

6. A dry dock having walls spaced apart and extending substantially parallel with the shore line, the inner wall being adjacent the shore, the dock having a floor above the bottom of the water, and gates at opposite ends of the dock to admit and exclude water and permit the entrance and exit of vessels to or from opposite ends of the dock.

7. A dry dock extending substantially parallel with the shore line, and provided with means at opposite ends for opening and closing the dock for the admission and exit of vessels, a track supported along the outer wall and a movable track extending from the land to the outer track.

8. A dry dock extending substantially parallel with the shore line, and provided with means at opposite ends for opening and closing the dock for the admission and exit of vessels, a track supported along the outer wall, and a bridge carrying a track from the land to the outer track.

9. A dry dock having spaced walls extending substantially parallel with the shore line and open at both ends for the entrance or exit of vessels, gates to close the ends of the dock between said walls, a track laid upon the outer wall, and a bridge having a track leading to the outer track, said outer wall having a seat receiving the outer part of said bridge.

Signed at New York city, in the county of New York and State of New York this second day of May A. D. 1911.

HENRY W. GOODRICH.

Witnesses:
MARY MOYNA,
EDWARD S. FRITH.

---

Copies of this patent may be obtained for five cents each, by addressing the "Commissioner of Patents, Washington, D. C."